No. 704,296. Patented July 8, 1902.
J. D. CARRINGTON, Dec'd.
J. S. WHITLA, Administrator.
AUTOMOBILE.
(Application filed Jan. 24, 1902.)
(No Model.)
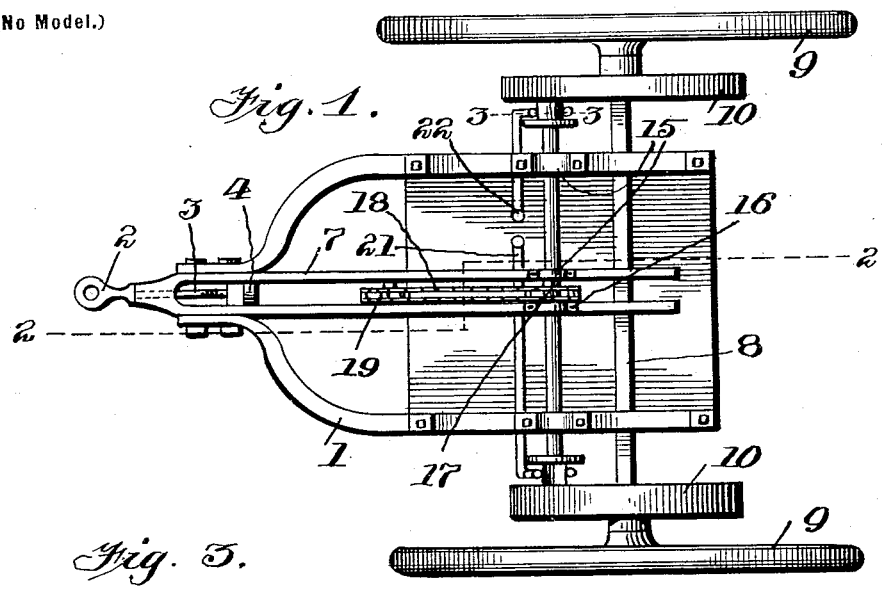
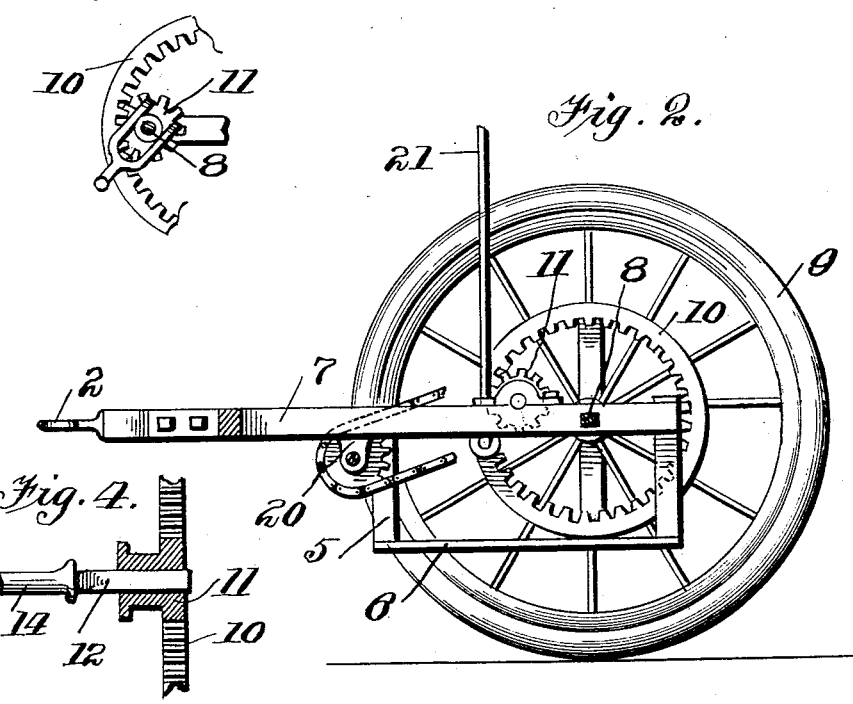
Witnesses:
Inventor,
Jackson D. Carrington.
By
Attorneys.

UNITED STATES PATENT OFFICE.

JACKSON D. CARRINGTON, OF NEWCASTLE, PENNSYLVANIA; JOHN S. WHITLA ADMINISTRATOR OF SAID CARRINGTON, DECEASED.

AUTOMOBILE.

SPECIFICATION forming part of Letters Patent No. 704,296, dated July 8, 1902.

Application filed January 24, 1902. Serial No. 91,069. (No model.)

*To all whom it may concern:*

Be it known that I, JACKSON D. CARRINGTON, a citizen of the United States of America, residing at Newcastle, in the county of Lawrence and State of Pennsylvania, have invented certain new and useful Improvements in Automobiles, of which the following is a specification, reference being had therein to the accompanying drawings.

This invention relates to certain new and useful improvements in automobiles, and relates more particularly to the running-gear.

The present invention has for its object the provision of novel means whereby the rear wheels may be independently thrown in and out of gear, thereby preventing the wheel from sliding or slipping when sharp curves are turned.

The present invention has for its further object to construct a running-gear that will effectually take up the irregularities formed in the path of travel; furthermore, the placing of the motive power beneath the rear axle and coupling or hounds, thus making it almost impossible for the vehicle to be upset.

This invention further aims to provide a vehicle that will be extremely simple in construction, strong, light, durable, and comparatively inexpensive to manufacture.

With the above and other objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate like parts throughout the several views, in which—

Figure 1 is a top plan view of the running-gear with my improvements attached thereto. Fig. 2 is a vertical sectional view taken on the line 2 2 of Fig. 1. Fig. 3 is a fragmentary view of the interior gear and pinion operating therein. Fig. 4 is a sectional view of the pinion, showing the same slidably attached to the square end of the shaft and meshing with the interior gear.

In the drawings the reference-numeral 1 represents the rear hounds of the running-gear, carrying at its forward end the swivel connection 2, carrying the adjustable screw-threaded rod 3, to which is secured the nut 4, said swivel connection 2 serving to connect the hounds or frame that supports the motive power with the front hounds. To said hounds 1 are secured the hangers 5, from which is suspended the platform 6 to receive the motor. (Not shown in the drawings.) Braces 7 of the rear hounds are connected together at their forward ends and extend rearwardly in parallel alinement with one another and embrace the rear axle 8 of the wheel 9. To the hub of the wheel 9 are fixed interior gears 10, and meshing with said interior gears are pinions 11, slidably secured upon the square ends 12 of the shaft 14, said shaft being secured in bearings 15, carried by the hounds 1. This shaft 14 extends through bearings 16, formed upon the braces 7, the shaft 14 having fixed thereon the sprocket-wheel 17, which is arranged between the bearings 16. The said sprocket-wheel carries an endless sprocket-chain 18, passing over the sprocket-wheel 19, secured to the hangers 20, attached to the braces 7. The operating-levers 21 and 22 engage the pinions 11 and extend upwardly at the right-hand side of the vehicle-body in order that the same may be readily grasped by the right hand of the operator. The sprocket-wheel 19 is operatively connected to the motor suspended and carried by the platform 6.

It will be noted that the brake may be operated either by hand or foot, as desired.

The operation of my improved running-gear is as follows: To run the machine, the driver should seat himself at right side of carriage, his left hand on the steering-lever. Turn on motive power. Wishing to turn a corner, reduce speed to safety with the right hand, throwing inner pinion out of gear and making the curve with one driving-wheel. When the lever is released, the pinion will be returned by the lever to its place and stay there until pulled out again. Power from the motor being transmitted to the sprocket-wheel 19 will communicate movement to the sprocket-wheel 17, rotating the shaft 14, carrying the pinions 11, which mesh in the interior gears, thereby rotating the wheels upon the spindles of the axle 8. As before stated, when it is desired to turn sharp curves the inner wheel, by means of the levers 21 and 22, is thrown out of gear, thereby preventing the inner wheel from slipping, as would otherwise be the case.

The many advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

1. In a running-gear, the combination with the rear axle and interior gears mounted thereon, of a pair of hounds secured to the axle and having inwardly-projecting forward ends, a pair of braces secured at their rear ends to the said axle, and having their forward ends connected together and arranged between the forward ends of the said hounds, means for securing the forward end of the braces and the hounds together, a swivel connection secured in the forward ends of the said braces, a driven shaft journaled in bearings secured to the said hounds and having square end portions, pinions slidably mounted on the ends of the said shaft, means for independently operating said pinions into and out of engagement with the said interior gears, and means carried by the said driven shaft to rotate the said pinions, substantially as described.

2. In a running-gear, the combination with the rear axle, gears mounted thereon, of a pair of hounds secured to the axles and having their forward ends projecting inwardly, and their rear ends extending to the rear of the axle, brace-rods secured to the axle, and having their forward ends secured between the said hounds, a driven shaft, pinions slidably mounted on said driven shaft, means to operate said pinions into and out of engagement with said gears, hangers secured to the said hounds to the front and rear of the axle, and a platform supported by the said hangers, substantially as described.

In testimony whereof I affix my signature in the presence of two witnesses.

JACKSON D. CARRINGTON.

Witnesses:
R. R. POTTER,
JOSEPH S. HOWARD.